(12) United States Patent
Bruckbauer et al.

(10) Patent No.: US 10,047,775 B2
(45) Date of Patent: Aug. 14, 2018

(54) ATTACHMENT ELEMENT

(71) Applicant: Schnabl Stecktecknik GmbH, St. Poelten (AT)

(72) Inventors: Wolfgang Bruckbauer, Zell am Moos (AT); Johann Neumayer, St. Poelten (AT)

(73) Assignee: SCHNABL STECKTECHNIK GMBH, Poelten (AT)

( * ) Notice: Subject to any disclaimer, the term of this patent is extended or adjusted under 35 U.S.C. 154(b) by 0 days.

(21) Appl. No.: 14/782,952

(22) PCT Filed: Apr. 28, 2014

(86) PCT No.: PCT/AT2014/000094
§ 371 (c)(1),
(2) Date: Oct. 7, 2015

(87) PCT Pub. No.: WO2014/183141
PCT Pub. Date: Nov. 20, 2014

(65) Prior Publication Data
US 2016/0053791 A1 Feb. 25, 2016

(30) Foreign Application Priority Data
May 13, 2013 (AT) .................................. A 391/2013

(51) Int. Cl.
*F16B 13/02* (2006.01)
*F16L 3/24* (2006.01)
(Continued)

(52) U.S. Cl.
CPC ............ *F16B 13/02* (2013.01); *F16B 13/025* (2013.01); *F16L 3/24* (2013.01); *H02G 3/32* (2013.01); *H02G 3/34* (2013.01)

(58) Field of Classification Search
CPC ........ F16B 13/00; F16B 13/02; F16B 13/025; F16L 3/24; H02G 3/32
(Continued)

(56) References Cited

U.S. PATENT DOCUMENTS 2,409,508 A * 10/1946 Miller ................... F16B 21/086
411/461
3,148,579 A   9/1964 Giovannetti
(Continued)

FOREIGN PATENT DOCUMENTS

AT       353 875       12/1979
AT       376 069       10/1984
(Continued)

OTHER PUBLICATIONS

International Search Report dated Jul. 22, 2014 in International Application No. PCT/AT2014/000094 filed Apr. 28, 2014.

*Primary Examiner* — Jonathan Liu
*Assistant Examiner* — Guang H Guan
(74) *Attorney, Agent, or Firm* — Jacobson Holman, PLLC.

(57) ABSTRACT

In an attachment element for fixing an object to a wall, wherein a shaft of the attachment element can be introduced into a hole in the wall and can be fixed to the inner surface of the hole, it is provided that the shaft has a substantially plate-like design and is formed, towards the interior of the hole, with two projections oriented oppositely to one another which project from the shaft counter to the direction of insertion of the shaft into the hole, are prestressed in the direction of the inner surface of the hole and of which the projecting lengths, prior to insertion into the hole, exceed a clear width of the inner surface of the hole, allowing a simple and secure fixing, in particular, by wedging the projections in the hole.

12 Claims, 3 Drawing Sheets

(51) Int. Cl.
*H02G 3/32* (2006.01)
*H02G 3/34* (2006.01)

(58) Field of Classification Search
USPC ........ 248/58, 60, 63, 67.7, 71, 73, 300, 317, 248/342; 411/451.3, 456–459, 461, 466, 411/478; 52/410, 511, 698
See application file for complete search history.

(56) References Cited

U.S. PATENT DOCUMENTS

| | | | |
|---|---|---|---|
| 3,439,463 A | 4/1969 | Matarese | |
| 3,598,013 A * | 8/1971 | Broberg | E21F 17/02 248/317 |
| 3,737,128 A * | 6/1973 | Schuplin | F16B 19/004 248/71 |
| 3,923,411 A * | 12/1975 | Berghman | E01C 11/106 404/64 |
| 3,983,779 A * | 10/1976 | Dimas | F16B 15/06 411/447 |
| 4,203,193 A * | 5/1980 | Arthur | E01B 9/06 238/366 |
| 4,260,122 A * | 4/1981 | Fiala | F16L 3/127 248/71 |
| 4,609,170 A * | 9/1986 | Schnabl | F16B 13/02 174/164 |
| 4,630,338 A * | 12/1986 | Osterland | F16B 5/123 24/293 |
| 4,633,640 A * | 1/1987 | Hutter | E04G 5/04 248/231.91 |
| 5,422,789 A * | 6/1995 | Fisher | H05K 7/12 24/295 |
| 5,845,883 A * | 12/1998 | Meyer | F16B 19/004 248/73 |
| 6,219,982 B1 * | 4/2001 | Eyring | E04B 1/6803 52/393 |
| 6,276,644 B1 | 8/2001 | Jennings et al. | |
| 6,296,430 B1 * | 10/2001 | Fischer | F16B 19/002 411/33 |
| 6,896,461 B2 * | 5/2005 | Fleydervish | F16B 37/02 411/55 |
| 6,899,498 B2 * | 5/2005 | Lowry | F16B 37/02 411/173 |
| 6,899,499 B2 * | 5/2005 | Dickinson | F16B 37/043 411/179 |
| 2005/0069398 A1 | 3/2005 | Arbuckle | |
| 2009/0245974 A1 * | 10/2009 | Yao | F16B 15/06 411/478 |
| 2016/0053791 A1 * | 2/2016 | Bruckbauer | H02G 3/32 248/71 |

FOREIGN PATENT DOCUMENTS

| | | |
|---|---|---|
| DE | 972 074 | 5/1959 |
| DE | 33 29 201 | 2/1985 |
| DE | 198 24 594 | 12/1999 |
| EP | 1 434 960 | 7/2004 |

* cited by examiner

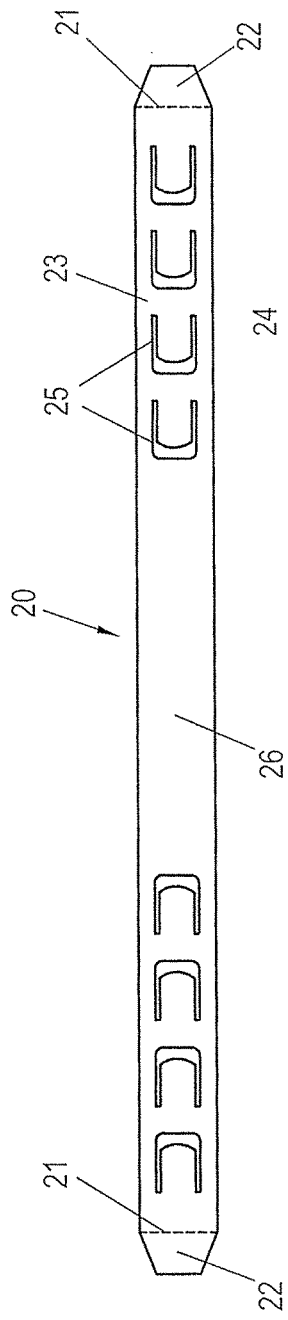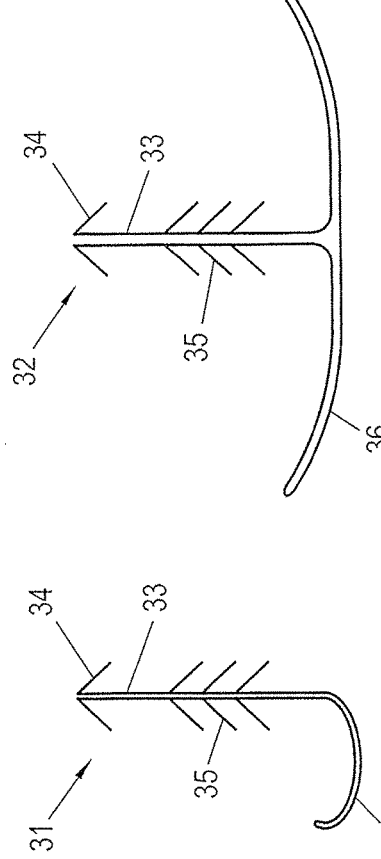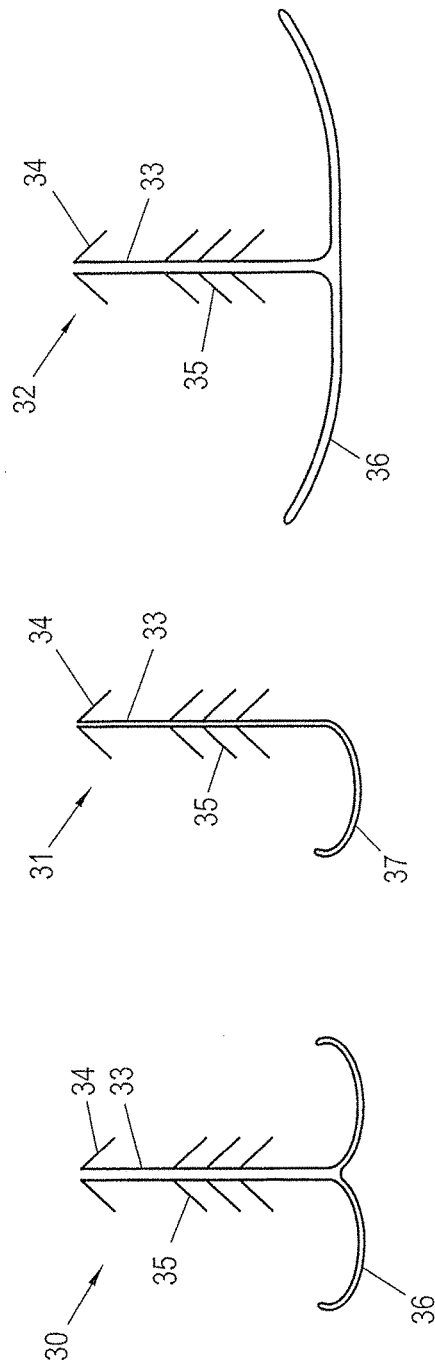

ATTACHMENT ELEMENT

BACKGROUND OF THE INVENTION

The present invention relates to an attachment element for fixing an object, e.g. a tube or cable, to a wall, wherein a shaft of the fasting element can be inserted into a hole in the wall and fixed to the interior surface of the hole via at least one projection projecting from the surface of the shaft, wherein the object can be fixed to a bracket or holder that is located outside the hole with the attachment element inserted in the hole, which bracket is connected or connectable to the shaft, wherein the shaft is substantially plate-shaped and, on its end facing the interior of the hole, is formed with two oppositely oriented projections or protrusions which project from the shaft oppositely to the direction of insertion of the shaft into the hole, are prestressed in the direction to the interior surface of the hole, and whose projecting lengths exceed a clear width of the interior surface of the hole prior to their insertion into the hole.

PRIOR ART

Fastening or attachment elements of this type are, for instance, used for fixing a tube or a cable to a wall as can, for instance, be taken from AT-B 376 069. Such fastening elements are usually made of plastic such that their anchorage within a hole provided in a wall may involve problems, and plastics usually do not have the strength that is required for taking up great stresses and high loads. In addition, plastics at least partially cannot be used under different temperature stresses or special external influences, since a reliable fixation of the attachment element and, in particular, its shaft in the hole of a wall cannot be safeguarded, particularly at high temperatures.

Further similar embodiments of fastening elements at least partially made of plastics, can, for instance, be taken from U.S. Pat. No. 6,276,644 B1, AT-PS 353 875, DE-PS 972 074, DE 33 29 201 A1, DE 198 24 594 A1, U.S. Pat. No. 3,148,579 or EP 1 434 960 A1.

An attachment or fastening element of the kind mentioned initially can, for instance, be taken from U.S. Pat. No. 3,439,463 A, in particular aiming at a fixation of covering elements for covering gaps or joints running in longitudinal directions between adjacent construction elements.

In some of those additionally mentioned, known embodiments, it is provided, in order to increase the loads to be taken up and enhance the safety in the fixation of objects even under different temperature stresses, that an additional element formed, for instance, by a bolt or screw is introduced or inserted into a dowel-like element so as to increase the retention force of such an attachment element in a wall or the like. It is immediately apparent that, when providing such additional anchoring elements, the use of such fastening elements will involve additional elevated expenditures in terms of installation and fixation.

BRIEF SUMMARY OF THE INVENTION

The present invention, therefore, aims to further develop an attachment or fastening element of the initially defined kind to the effect that the above-mentioned drawbacks and problems will be avoided. It is, in particular, aimed to provide an attachment element that will not only enable the simple and reliable insertion or arrangement of the attachment element into a hole in a wall for subsequently fixing an object, e.g. a tube or cable, but also ensure that such an attachment element, and objects fixed thereto, will be fixed, and remain secured, in the desired positions over correspondingly long periods of time, for instance in order to maintain emergency functions or safety functions, under different temperature stresses, e.g. in the event of fire.

To solve these objects, an attachment element of the initially defined kind is essentially characterized in that the shaft is formed with at least one further projection or protrusion over its longitudinal extension in addition to the projections formed on its end, projecting from the shaft oppositely to the direction of insertion of the shaft into the hole. In that the inventive attachment element is formed with two oppositely oriented projections or protrusions on the end of the substantially plate-shaped shaft, the reliable fixation of the attachment element will be additionally ensured by the projections or protrusions oriented oppositely to the direction of insertion of the shaft into the hole after the insertion of the shaft of the attachment element into the hole, without additionally requiring supplementary fixing elements such as bolts, as has been necessary in the prior art in order to achieve a sufficiently secure fixation. Because the projections or protrusions are prestressed in the direction to the interior surface of the hole, the projections or protrusions will be fixed to the interior surface of the particularly circular hole in any inserted position of the shaft of the attachment element. Such fixing or clamping of, in particular, the free ends of these projecting projections or protrusions is achieved in that the projecting lengths of the projections or protrusions exceed the clear width of the hole and the projections or protrusions are prestressed in the direction to the inner surface of the hole. By the simple introduction or insertion of the attachment element into the borehole while applying a slight pressure, it has thus become possible to accomplish the attachment or fixation of the same without using tools and without using additional anchoring elements, wherein the projections or protrusions projecting oppositely to the direction of insertion of the shaft allow for the achievement of a safe fixation by clamping on the interior surface of the hole. Such clamping or wedging will, moreover, ensure that the safe and reliable fixation of objects to be fixed to the attachment element, e.g. tubes or cables, will be enabled via the bracket or holder provided on, or connectable to, the attachment element in order to maintain the desired functioning even under adverse service conditions. In order to further enhance the anchoring effect and the stability of the attachment element according to the invention when fixed in a hole or borehole, according to the invention it is furthermore provided that the shaft is formed with at least one further projection or protrusion over its longitudinal extension in addition to the projections formed on its end from the shaft projecting oppositely to the direction of insertion of the shaft into the hole. Such additional projections or protrusions can be distributedly arranged over the length of the shaft as a function of the respective requirements. This will also enable the substantially central positioning of the shaft in the borehole, which is provided or sought for the entire length of the shaft, and an increase in the anchoring effect of the attachment element according to the invention against the extraction of the attachment element and, in particular, its shaft from the hole, in particular with large shaft lengths.

According to a preferred and easily producible embodiment, it is provided according to the invention that the shaft is formed by a double-layer spring element, in particular leaf spring element, and, on its end facing the interior of the hole, is each formed with a projection on each layer. It has thus become possible to not only produce the attachment element according to the invention in a simple and cost-effective way, but also ensure a safe anchoring effect by the projections or protrusions provided on the end of the shaft.

For a particularly simple production of the attachment element according to the invention, it is moreover provided that the projections provided on the end of the shaft are formed by ends that are bent oppositely to the longitudinal extension of the shaft or ends that are partially folded back.

In order to avoid any additional elevated stress during the insertion of the shaft of the attachment element into the hole while simultaneously seeking to increase or enhance the anchoring effect, it is provided according to a further preferred embodiment that the additional projections have dimensions reduced relative to those of the projections disposed on the end of the shaft.

In order to enable a particularly simple manufacture of said additional projections or protrusions, it is proposed that the additional projections are formed by punched-out partial regions of the shaft, which are bent or folded out of the plane of the shaft, as in correspondence with a further preferred embodiment of the attachment element according to the invention.

In order to ensure sufficiently good anchorage after the insertion of the shaft of the attachment element into the hole, it is proposed according to a further preferred embodiment that the projections provided on the end of the shaft and/or the additional projections, on their ends facing the interior surface of the hole, comprise roundings, or edge elements formed in particular by mutually obliquely extending end portions, or tips, in particular tapering tips. When providing a rounding, the simple introduction of the shaft into the hole will, in particular, be achieved in that, for instance, the radius of the rounding is adapted to the radius or diameter of the hole. When providing substantially sharp-edged peripheries and/or additional tips, the anchoring effect, or counter-force exerted by the projecting projections or protrusions against extraction, will be increased by such sharp-edged regions being suitably clamped in the wall of the hole.

In order to further enhance the anchoring effect, it is proposed according to a further preferred embodiment of the attachment element according to the invention that the additional projections are formed by partial regions of the shaft projecting from side edges of the shaft. Such additional projections provided on the side edges of the shaft will further enhance the anchoring effect, in particular on the edges of holes, wherein such partial regions projecting from side edges of the shaft can be produced in a simple manner by punching or appropriate incisions in the side edges of the shaft, and bending of the punched-out or incised partial regions out of the plane of the shaft.

In order to increase the strength of the attachment elements according to the invention and/or achieve high strength values at appropriately small material cross sections, it is provided according to a further preferred embodiment that the shaft and/or the projections is/are provided with reinforcing elements, in particular ribs, grooves or webs extending in the longitudinal direction. Such reinforcing elements like e.g. ribs, grooves or webs can be readily produced, for instance on partial regions of the shaft or on the projections, by suitable stamping processes in the event of a metallic fastening element, allowing for the respective reinforcement of at least partial regions of the attachment element, in particular against bending stresses or general deformation stresses.

In order to avoid, in particular, mutual displacements or shifts of the partial regions of the shaft during the insertion into a hole possibly having small dimensions such that, if need be, elevated forces will become active during the insertion of the shaft into the hole, it is proposed according to a further preferred embodiment that the layers of the shaft, which, in particular, extend in parallel with each other, are connected to each other, in particular by a spot-weld, on their ends facing the interior of the hole.

For a particularly simple and reliable coupling of the shaft of the attachment element to a bracket for receiving or fixing an object to be fixed, it is moreover proposed that a partial region of the attachment element intended for fixation or connection to the bracket, or the bracket, is designed in one piece or integral with the shaft, as in correspondence with a further preferred embodiment of the attachment element according to the invention.

For a particularly simple and reliable production of the attachment element according to the invention, it is moreover proposed in a preferred manner that the partial region intended for fixation of the bracket, or the bracket, and the shaft are made of a one-piece blank capable of being folded into a shape defining both the double-layer shaft and the partial region for receiving the bracket, or the bracket. Such a blank can be provided according to the desired dimensions so as to enable the attachment element according to the invention to be produced in a simple and cost-effective manner.

In order to enable the particularly simple and reliable coupling of a bracket to be provided separately from the shaft and optionally having larger dimensions, it is proposed according to a further preferred embodiment that the bracket can be coupled to the partial region projecting out of the hole, of the attachment element via a plug-in connection.

As already pointed out above, the attachment element according to the invention is to ensure the safe functional maintenance of objects to be fixed by such fastening elements even under different temperature stresses, e.g. in the event of fire, partially over comparatively long periods of time as prescribed by relevant standards. In this context, it is proposed according to a further preferred embodiment of the attachment element according to the invention that the shaft and the partial region intended for fixation of the bracket, or the bracket, are made of a high-temperature-resistant material.

In order to meet correspondingly high demands, in particular in terms of temperature resistance in the event of fire, it is provided according to a further preferred embodiment that the shaft is made of a metal, in particular spring steel. In this context, it is, moreover, additionally and preferably proposed that the bracket is made of a metallic material.

In particular as a function of the object to be fixed and for the protection of the latter upon fixing, it is, moreover, proposed that the metallic material of the bracket is provided with a sheath made, in particular, of plastic, as in correspondence with a further preferred embodiment of the attachment element according to the invention.

Bearing in mind the diversity of objects to be fixed, it is moreover proposed according to the invention that the bracket is formed by a collective holder, a cable bracket, a single or multiple clamp, or the like.

BRIEF DESCRIPTION OF THE SEVERAL VIEWS OF THE DRAWINGS

In the following, the invention will be explained in more detail by way of exemplary embodiments schematically illustrated in the accompanying drawing. Therein:

FIG. 5 is a top view of a blank for forming an attachment element according to the invention as illustrated, for instance, in FIG. 1 to 3 or FIG. 4;

FIGS. 6 to 8 depict schematic views of further, different embodiments of an attachment element according to the invention having different configurations of integrated brackets for fixing objects;

DETAILED DESCRIPTION OF THE INVENTION

Figure 1:
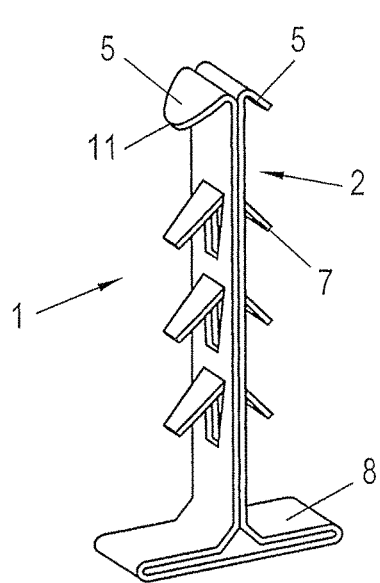
FIG. 1 is a perspective view of a first embodiment of an attachment element according to the invention.
Figure 2:
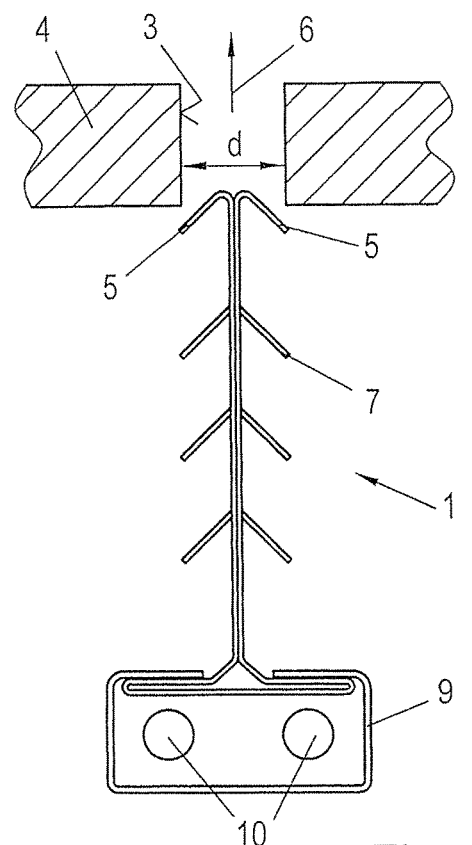
FIG. 2 is a side view of the attachment or fastening element of FIG. 1, with a bracket intended for fixation of an object and disposed on a partial region of the attachment element differently from the shaft being additionally indicated.
Figure 3:
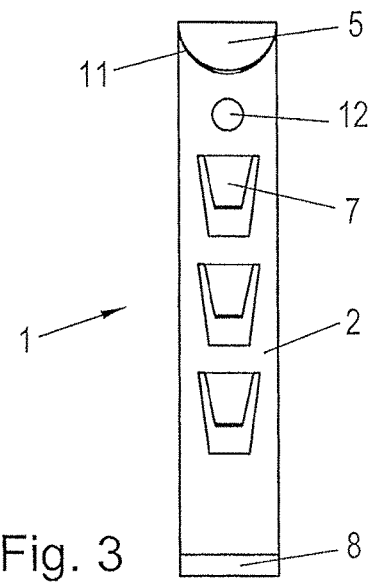
FIG. 3 is a side view of the shaft of the attachment element according to FIG. 1.

In FIGS. 1 to 3, a first embodiment of an attachment element is denoted by 1, wherein a projection or protrusion 5 is each formed on a substantially plate-shaped shaft 2 comprised of two layers, on its ends facing a hole provided in a wall 4, which hole is schematically denoted by 3 in FIG. 2. The projections or protrusions 5 on the free ends of the shaft 2 are oriented oppositely to the direction of insertion into the hole 3, which is denoted by 6 in FIG. 2, are prestressed in the direction of the periphery of the hole 3 in a configuration of at least the shaft 2 of the attachment element 1 as a spring element, in particular leaf spring element, and have a projecting length slightly exceeding the clear width d, or inner diameter, of the hole 3, as is particularly apparent from FIG. 2.

In addition to these projections or protrusions 5 provided on the free ends of the shaft 2, further projections or protrusions 7 are additionally distributed over the length of the shaft 2, which, as is particularly apparent from FIGS. 1 and 3, have dimensions smaller than those of the projections 5 provided on the free ends. These additional projections or protrusions 7 are, for instance, formed by punching of the plate-shaped layers of the shaft 2 and, like the projections 5 provided on the free ends, are oriented oppositely to the direction of insertion 6 of the attachment element 1 into the hole 3.

By orienting the projections or protrusions 5 and 7, respectively, oppositely to the direction of insertion 6, the securing of the attachment or fastening element 1 within the hole 3 is ensured by the abutment of the projecting ends of the projections or protrusions 5 and 7, respectively, wherein the attachment element 1 can be introduced into the hole 3 by simply inserting, and slightly pressing, the shaft 2 with the projections or protrusions 5 and 7 into the same. Such wedging of the free ends of the projections or protrusions 5 and 7 will immediately act against an extraction of the attachment element 1 opposite to the direction of insertion 6 so as to enable the attachment element 1 to be easily and reliably anchored within the hole 3.

Securing of the relative positioning of the layers of the shaft 2 is indicated by a spot-weld 12 in FIG. 3.

From FIGS. 1 and 2, it is, in particular, apparent that, on the end of the shaft facing away from the projecting projections or protrusions 5, a partial region 8 is provided, which in the embodiment illustrated in FIGS. 1 to 3 is provided for arrangement or coupling with a holding means or bracket 9, as can be seen in FIG. 2. Said bracket or holder 9 can be fixed to the partial region 8 of the attachment element 1 by a simple plug-in connection. As is also schematically indicated in FIG. 2, such a box-shaped bracket is able to subsequently receive, and secure to a wall 4, an object to be fixed such as, e.g. a tube or cable 10, by fixing the attachment element 1 within the hole 3.

Figure 4:
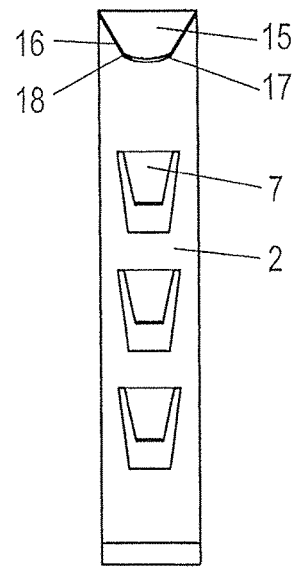
FIG. 4, in an illustration similar to that of FIG. 3, depicts a view of the shaft of a modified embodiment of an attachment element according to the invention.

While in the embodiment according to FIGS. 1 to 3 the projections or protrusions 5 are each substantially formed with a rounding 11 on the end of the shaft 2, it is provided in the modified embodiment depicted in FIG. 4 for the projections or protrusions, which are denoted by 15 in FIG. 4, that at least partially obliquely extending edge elements 16 and 17 are provided, which produce sharp-edged partial regions 18 similar to those of the additional projections 7. Such sharp-edged partial regions 18 will enhance the anchoring effect in the hole 3, in particular of the projections or protrusions 15 provided on the free ends of the shaft 2.

By contrast, the embodiment according to FIGS. 1 to 3 allows for a correspondingly simple and reliable introduction of the projections or protrusions 5 provided on the free ends of the shaft 2 by providing roundings 11.

FIG. 5 schematically depicts a top view of a blank 20 of an attachment element to be produced. Such a blank 20 is of extremely simple form, the projections or protrusions 22 provided on the free ends being folded back along a folding line denoted by 21 so as to provide projections or protrusions 22.

The projections or elevations 24 additionally provided over the length of the shaft 23 are produced by punched-out portions 25 and are also simply bent out of the plane defined by the shaft 23.

Correspondingly to the partial region 8 to be produced, as it is illustrated in the embodiment according to FIGS. 1 to 3, a central region 26 of the blank 20 is provided, wherein the folding lines to be provided for the formation of the partial region 8 are not illustrated in detail in FIG. 5 for the sake of simplicity.

In FIGS. 6 to 8, further modified embodiments of fastening elements 30, 31 and 32 are respectively illustrated, which, as in the preceding embodiments, each comprise respective projections or protrusions 34 on their free ends of a shaft each denoted by 33. Additional projections or protrusions, which are distributed over the length of the shaft 33 and formed, for instance, by punching as in the preceding embodiment, are each denoted by 35.

As in contrast to the preceding embodiments, it is indicated in the exemplary embodiments depicted in FIGS. 6 to 8 that a bracket is each formed integrally or in one piece with the shaft 33, wherein FIGS. 6 and 8 each depict substantially symmetrically configured brackets, e.g. in the form of a cable bracket or a multiple clamp, while a single clamp 37 is indicated in the embodiment according to FIG. 7.

When producing such fastening elements 30, 31 or 32 from a blank as indicated in FIG. 5, a correspondingly larger or longer dimensioned central region is provided for the additional formation of brackets 36 or 37, which central region is denoted by 26 in FIG. 5.

Instead of integrating the brackets 36, 37 in the attachment elements 30, 31 and 32, respectively, as is indicated in FIGS. 6 to 8, such brackets can also be designed or provided separately in the form of cable brackets or clamps and fixed to a partial region of the attachment elements similarly as in the configuration according to FIG. 2.

In order to achieve appropriate strength or resistance values, e.g. under different temperature conditions such as in the event of fire, an attachment element, or a respective blank as depicted in FIG. 5, is made of a suitable, high-temperature-resistant material, in particular metallic material. When produced of a metal, in particular spring steel, the achievement of a correspondingly good anchoring effect by means of the projections or protrusions oriented oppositely to the direction of insertion of the shaft of the attachment element will also be possible.

Figure 9:
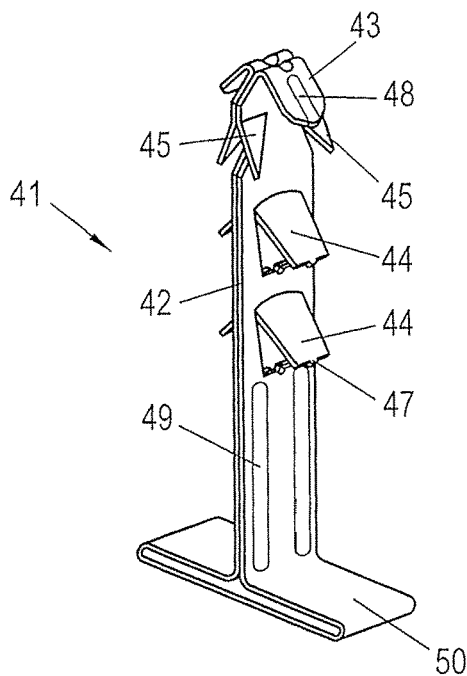
FIG. 9 is a perspective view of a further embodiment of an attachment element according to the invention similar to the illustration of FIG. 1.
Figure 10:
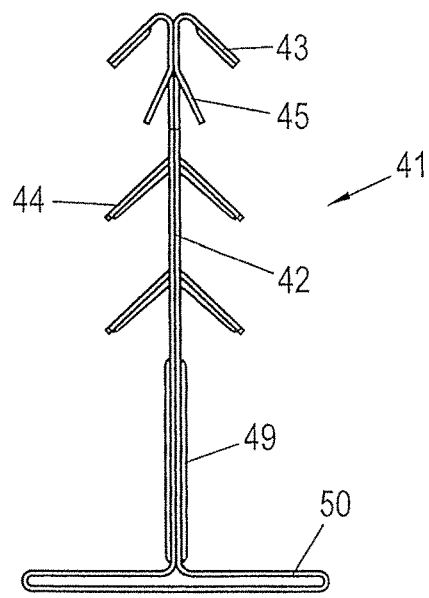
FIG. 10 is a side view of the attachment element of FIG. 9.
Figure 11:
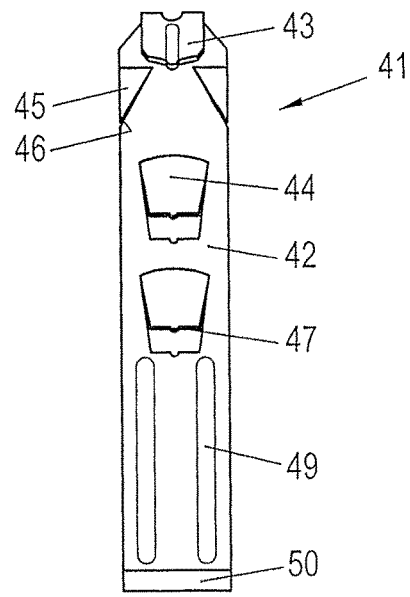
FIG. 11 is a side view of the shaft of the attachment element of FIG. 9.

In the further fastening element 41 illustrated in FIGS. 9 to 11, projections or protrusions 43 again project from ends of the shaft 42, said projections or protrusions being formed by partial regions bent oppositely to the direction of extension of the shaft 42 as in the preceding embodiments.

Additional projections or protrusions 44 are, moreover, provided along the longitudinal extension of the shaft 42, which projections or protrusions like in the preceding embodiments are, for instance, formed by punching of the plate-shaped layers or plies of the shaft 42 and bending out of the plane of the shaft.

Besides these additional projections or protrusions 44 provided substantially centrally along the longitudinal extension of the shaft 42, further projections or protrusions 45 are to be seen, in particular close to the end regions of the shaft 42, said further projections or protrusions each projecting from side edges of the shaft 42. These additional projections 45 are, for instance, formed by providing suitable cuts along the side edges and bending the respective partial regions out of the plane of the shaft 42, such cuts being, for instance, indicated by 46 in FIG. 11. These additional projections or protrusions 45 provided on the side edges of the shaft 42, in particular, serve for anchoring in edge regions of the attachment element 41 inserted in a particularly circular hole such that the projecting distance of these additional projections 45 is smaller than the projecting distance of the substantially central additional projections 44 as well as the projections 43 provided on the ends, as is clearly apparent from FIG. 10.

In order to further enhance the anchoring effect, tapering tips 47 are, in particular, provided on the projecting end edges of the substantially centrally arranged, additional projections 44 in the embodiment according to FIGS. 9 to 11, which tapering tips will further enhance the anchoring effect of the attachment element 41.

In order to increase the strength of the attachment element 41, the projections or protrusions provided on the ends of the shaft 42 comprise reinforcing elements formed by grooves or ribs 48, which grooves or ribs 48 can, for instance, be produced by punching and, in particular, extend in the longitudinal direction of said projections 43.

Likewise, in order to increase the strength of the shaft 42, for instance against deformation stresses, reinforcing means, again formed by ribs 49 are provided on the shaft 42, in particular in partial regions that are free of projections 44, which reinforcing means are, for instance, able to enhance the torsional strength of the attachment element 41.

As in the preceding embodiments, a partial region 50 is provided on the end region of the shaft 42 facing away from the projecting projections or protrusions 43, which partial region will subsequently be connectable to a bracket (not illustrated) intended for an object to be, for instance, fixed, or cooperate with such a bracket.

The invention claimed is:

1. An attachment apparatus for fixing an object to a wall, the wall having a hole and an interior surface defining the hole, the attachment apparatus comprising:
   a shaft including two substantially plate-shaped layers extending in parallel to each other, the two substantially plate-shaped layers each including an upper portion with an upper end, a middle portion, and a lower portion, the two substantially plate-shaped layers being connected to each other by a spot-weld at the upper portions;
   two upper protrusions each projecting from the upper end of the upper portion of a respective one of the two substantially plate-shaped layers of the shaft, each of the two upper protrusions being bent from the respective one of the two substantially plate-shaped layers of the shaft, the two upper protrusions being sloping downwardly from the upper ends of the upper portions of the two substantially plate-shaped layers of the shaft and diverging from each other, each of the two upper protrusions being a tapered protrusion with two spaced-apart edge regions downwardly extending toward each other and a sharp-edged region connecting the two spaced-apart edge regions;
   one or more lower protrusions downwardly projecting from the middle portion of each of the two substantially plate-shaped layers of the shaft, each of the one or more lower protrusions downwardly projecting from the middle portion of each of the two substantially plate-shaped layers being arranged below the spot-weld and spaced apart from opposite longitudinal edges of each of the two substantially plate-shaped layers of the shaft, each of the one or more lower protrusions downwardly projecting from the middle portion of each of the two substantially plate-shaped layers of the shaft having reduced dimensions relative to dimensions of each of the two upper protrusions;
   an attachment region extending from the lower portions of the two substantially plate-shaped layers of the shaft, the attachment region being oriented substantially perpendicular to the shaft; and
   a bracket configured to be attached to the attachment region for holding the object;
   wherein the two upper protrusions are pre-stressed such that a lower terminal free end of a first one of the two upper protrusions is spaced apart from a lower terminal free end of a second one of the two upper protrusions at a horizontal distance;
   wherein the shaft is configured to be inserted in an upward vertical direction into the hole with a clear width less than the horizontal distance and be fixed to the interior surface defining the hole via the two upper protrusions and the one or more lower protrusions downwardly projecting from the middle portion of each of the two substantially plate-shaped layers of the shaft.

2. The attachment apparatus according to claim 1, wherein each of the two substantially-plate shaped layers of the shaft is a spring element.

3. The attachment apparatus according to claim 1, wherein each of the one or more lower protrusions downwardly projecting from the middle portion of each of the two substantially plate-shaped layers of the shaft is formed by a punched-out partial region of the middle portion of the respective one of the two substantially plate-shaped layers of the shaft, and each punched-out partial region is bent or folded out of a plane of the respective one of the two substantially plate-shaped layers of the shaft.

4. The attachment apparatus according to claim 1, wherein the attachment region is integral with the shaft.

5. The attachment apparatus according to claim 1, wherein the two upper protrusions, the shaft, and the attachment region are made of a one-piece blank capable of being folded into a shape defining the two upper protrusions, the shaft, and the attachment region.

6. The attachment apparatus according to claim 1, wherein the bracket is coupled to the attachment region via a plug-in connection.

7. The attachment apparatus according to claim 1, wherein the attachment region is configured to be positioned outside of the hole to support the bracket.

8. The attachment apparatus according to claim 1, wherein the two protrusions, the shaft, and the attachment region are made of a high-temperature-resistant material.

9. The attachment apparatus according to claim 1, wherein the shaft is made of a metallic material.

10. The attachment apparatus according to claim 1, wherein the bracket is made of a metallic material.

11. The attachment apparatus according to claim 1, wherein each of the two substantially plate-shaped layers of the shaft is a leaf spring element.

12. The attachment apparatus according to claim 1, wherein the shaft is made of spring steel.

* * * * *